(12) United States Patent
Huang et al.

(10) Patent No.: US 10,976,493 B2
(45) Date of Patent: Apr. 13, 2021

(54) CONTROLLABLE DIAMOND WAVEGUIDE TUNER

(71) Applicant: HEWLETT PACKARD ENTERPRISE DEVELOPMENT LP, Houston, TX (US)

(72) Inventors: Zhihong Huang, Palo Alto, CA (US); Charles M Santori, Palo Alto, CA (US); Di Liang, Santa Barbara, CA (US); Sonny Vo, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 148 days.

(21) Appl. No.: 15/119,824

(22) PCT Filed: Apr. 30, 2014

(86) PCT No.: PCT/US2014/036138
§ 371 (c)(1),
(2) Date: Aug. 18, 2016

(87) PCT Pub. No.: WO2015/167521
PCT Pub. Date: Nov. 5, 2015

(65) Prior Publication Data
US 2017/0059778 A1 Mar. 2, 2017

(51) Int. Cl.
*G02B 6/293* (2006.01)
*G02B 6/122* (2006.01)
(Continued)

(52) U.S. Cl.
CPC ......... *G02B 6/29395* (2013.01); *G02B 6/122* (2013.01); *G02B 6/12007* (2013.01);
(Continued)

(58) Field of Classification Search
CPC ............ G02B 6/29395; G02B 6/12033; G02B 6/3596
See application file for complete search history.

(56) References Cited

U.S. PATENT DOCUMENTS 5,173,956 A 12/1992 Hayes et al.
5,781,331 A * 7/1998 Carr .......................... G01J 3/02
359/288
(Continued)

FOREIGN PATENT DOCUMENTS

WO WO-2005101115 A1 10/2005

OTHER PUBLICATIONS

Bassett, L.C., Electrical Tuning of Single-photon Emission in Diamond Devices, Feb. 29, 2012.
(Continued)

*Primary Examiner* — Chris H Chu
(74) *Attorney, Agent, or Firm* — Hewlett Packard Enterprise Patent Department (57) ABSTRACT

An example device in accordance with an aspect of the present disclosure includes a diamond waveguide disposed on a substrate. The substrate includes a dielectric material. A tuner is to extend from the substrate, and is disposed at least in part over the waveguide. The tuner includes a tuner electrode to control a variable distance between the tuner and the waveguide to vary an effective refractive index of the waveguide.

11 Claims, 5 Drawing Sheets

(51) Int. Cl.
*G02B 6/12* (2006.01)
*G02F 1/225* (2006.01)
*G02F 1/21* (2006.01)

(52) U.S. Cl.
CPC ..... *G02B 6/12033* (2013.01); *G02B 6/29382* (2013.01); *G02F 1/2255* (2013.01); *G02B 2006/12035* (2013.01); *G02F 2001/212* (2013.01)

(56) References Cited

U.S. PATENT DOCUMENTS

| | | | | |
|---|---|---|---|---|
| 6,708,491 | B1* | 3/2004 | Weaver | B81B 3/0024 60/527 |
| 6,718,764 | B1* | 4/2004 | Sarkar | B81B 3/0024 60/527 |
| 7,263,251 | B2 | 8/2007 | Shirane et al. | |
| 7,805,031 | B2 | 9/2010 | Spillane et al. | |
| 2003/0058902 | A1* | 3/2003 | Yuen | H01S 5/18366 372/20 |
| 2003/0117679 | A1* | 6/2003 | Wood | G02B 26/0841 359/226.1 |
| 2003/0169786 | A1* | 9/2003 | Kapon | B82Y 20/00 372/20 |
| 2009/0238515 | A1 | 9/2009 | Fattal et al. | |
| 2010/0183302 | A1 | 7/2010 | Lamvik et al. | |
| 2011/0026879 | A1* | 2/2011 | Popovic | G02B 6/107 385/28 |
| 2011/0103733 | A1 | 5/2011 | Tang et al. | |
| 2012/0008658 | A1* | 1/2012 | Chung | H01S 5/10 372/45.01 |
| 2013/0152694 | A1* | 6/2013 | Urvas | G01L 9/0048 73/724 |

OTHER PUBLICATIONS

Huang, Z., et al., Microring Resonator-based Diamond Opto-termal Switch—a Building Block for a Quantum Computing Network, Mar. 29, 2013, Proc. SPIE 8635, Advances in Photonics of Quantum Computing, Memory, and Communication VI, 86350E, vol. 8635, pp. 86350E1-7.

Tomlijenovic-Hanic, et al., Design of Flexible Ultrahigh-Q Microcavities in Diamond-based Photonic Crystal Slabs [online], Oct. 12, 2008, Retrieved from the Internet: <http://arxiv.org/ftp/arxiv/papers/0812/0812.1822.pdf> [retrieved on Feb. 28, 2014], 9 pages.

Unknown, Electrical Tuning of Nitrogen-vacancy Center Optical Transitions, Apr. 12, 2012.

* cited by examiner

CONTROLLABLE DIAMOND WAVEGUIDE TUNER

BACKGROUND

Optical devices may be based on diamond, such as diamond waveguides including nitrogen-vacancy (NV) centers that may be sensitive to temperature changes. Optical devices may be switched using thermal tuning associated with large changes in temperature and slow switching speeds.

DETAILED DESCRIPTION

Examples provided herein enable a diamond optical switch that is tunable based on a movable tuner, e.g., a microelectromechanical systems (MEMS) tuner. Fabrication of diamond-based optical devices may involve a large fraction of defective devices, and an optical switch provides the capability to tolerate a large fraction of defective devices by routing/switching signals to working devices. Furthermore, a movable tuner may be used to correct for variations in cavity resonance frequencies corresponding to fabrication tolerances (e.g., to 'trim' a device). Using a movable tuner avoids a need to transfer extra heat to the optical device, which is associated with thermal tuning. The tuner may consume relatively low energy, on the order of a few volts, for optical switching. Thus, example devices are not exposed to dramatic temperature changes for thermal tuning (e.g., thermal tuning temperature swings of 10 Kelvin (K) to 380 K to achieve tuning of one linewidth), and there is no need for spacing devices out using long distances in between them, or other complicated processes, to isolate devices that may be sensitive to temperature such as NV-based diamond-based optical switches. A tuning speed enabled by movable tuners also may be relatively high, on the order of megahertz (MHz). Accordingly, example diamond optical switch devices may be integrated in a diamond photonic network to build quantum information processors. Tuned diamond optical switches may be fabricated based on simple processes, and may be operated according to high power efficiency and fast tuning speed/frequency (on the order of 1 megahertz (MHz)).

Figure 1:
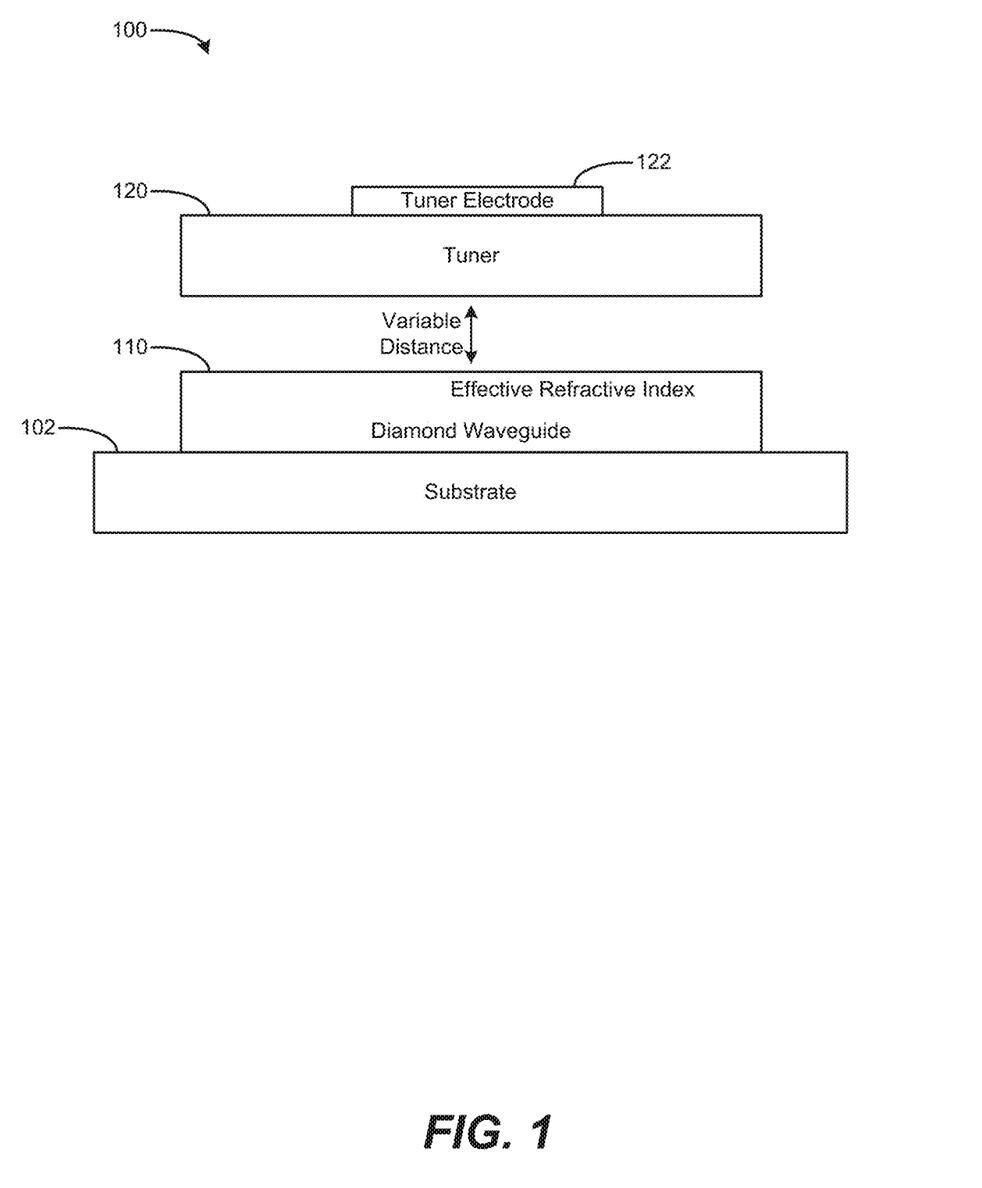
FIG. 1 is a side view block diagram of a device including a tuner and waveguide according to an example.

FIG. 1 is a side view block diagram of a device 100 including a tuner 120 and waveguide 110 according to an example. The waveguide 110 is disposed on a substrate 102, and has an effective refractive index that depends on a variable distance from the tuner 120. The tuner 120 includes a tuner electrode 122. The tuner 120 may be supported by the substrate 102, e.g., by extending from the substrate 102 along one or more sides. However, such extensions are not illustrated in FIG. 1.

The substrate 102 is to support the diamond waveguide 110. It is desirable that the substrate 102 does not negatively interfere with the electrical and/or optical properties of the waveguide 110. Accordingly, the waveguide 110 may be disposed on an oxide (e.g., silicon oxide, aluminum oxide), nitride (e.g., silicon nitride), or other dielectric material. Accordingly, because such materials do not have a refractive index higher than diamond, the optical mode of the diamond waveguide 110 is not coupled/lost into the substrate 102 (unlike, e.g., if the substrate 102 were made of a material such as silicon that appeared as lossy relative to the waveguide 110). Accordingly, most the optical mode of the waveguide 110 may remain in the diamond for enhanced efficiency.

The diamond waveguide 110 may be provided in many forms, such as a linear waveguide, a collection of interconnected waveguides (Mach-Zehnder modulator), a resonant waveguide (e.g., microring, race track ring distributed Bragg reflector, photonic crystal, etc.), a curved waveguide, and so on. The waveguide 110, during use, may be associated with an evanescent field extending from the waveguide 110 into a region proximate to the waveguide 110. The tuner 120 may move toward or away from this field (including fully entering or exiting the field), based on the variable distance between the waveguide 110 and the tuner 120.

The tuner 120 may be a fix-free MEMS structure, where a portion of the tuner 120 is fixed to (e.g., extending from) the substrate 102, and the other portion is not supported. An example fix-free structure may be a cantilever tuner 120. A fixed portion of the tuner 120 is not specifically shown in the side view of FIG. 1. The tuner 120 also may be a fix-fix MEMS structure, where a plurality of ends/edges of the tuner 120 are supported/extending from the substrate 102. In an example, the tuner 120 may be a membrane disposed over and spaced from the waveguide 110. A fix-free MEMS structure may be actuated using relatively less voltage compared to a fix-fix MEMS structure. The tuner 120 may be provided as a cantilever MEMS structure, extending on one side from the substrate 102 above the diamond waveguide 110. In an example, a structure of the tuner 120 may have a total thickness on the order of approximately 150 nanometers (nm), which may include other tuner layers/structures not specifically shown in the figures, and may be thicker or thinner.

The tuner electrode 122 may be controlled to provide a bias/force to the tuner 120, for adjusting the variable distance between the tuner 120 and the diamond waveguide 110. For example, the tuner electrode 122 may be provided (e.g., by a controller, not shown) with a first voltage/charge polarity. A second voltage value, of like polarity, may be placed on the substrate 102, causing electrical repulsion between the voltage at the substrate 102 and the voltage at the tuner electrode 122 (and thus tuner 120). When provided with opposite voltage/charge polarity, the tuner electrode 122 is attracted toward the substrate 102. In alternate examples, other techniques may be used to move the tuner, such as mechanically touching and applying a force to the tuner, or optically interacting with the tuner 120 to move it.

The tuner electrode 122 may be a metal contact, may be transparent, and also may be lossy. The tuner electrode 122 is shown on a top surface of the tuner 120, and may be disposed on other surfaces (e.g., a bottom) and/or within the tuner 120. The tuner 120 and/or tuner electrode(s) 122 may be used to vary the effective refractive index and/or loss of a mode in the diamond waveguide 110. A nitride tuner 120 with a metal electrode may be used for tuning by being placed at varying distances from the waveguide 110, including being at least partially within an evanescent field region of the waveguide 110. Being within the evanescent field of the waveguide 110 enables the waveguide mode to experience effects from the material (e.g., metal) of the tuner electrode 122, resulting in optical loss at the waveguide. Thus, the tuner 120 (and associated components such as the tuner electrode 122) may be used to change not only the modal index of the waveguide 110 (and thereby change the effective refractive index of the waveguide 100), but also the modal loss of the waveguide 110.

In an example, the tuner electrode 122 is metal and is disposed on a top surface of the tuner 122 as illustrated, and the tuner 120 is a dielectric that has a lower refractive index than diamond (e.g., diamond waveguide 110). Accordingly, relative effects of the metal tuner electrode 122 and the dielectric tuner 120 may depend on a thickness of the tuner 120, relative to the evanescent field decay length inside of the tuner 120. If the tuner is thicker, less optical energy may reach the electrode. For example, for diamond (refractive index n=2.4) and nitride (n=2.0), the evanescent field energy decay length may be on the order of ~40 nm (at 637 nm vacuum wavelength). Accordingly, for a tuner 120 having a thickness on the order of a few hundred nanometers thick, the top-surface tuner electrode 122 may introduce very little effect. The tuner electrode 122 accordingly may be positioned to achieve desired effects, based on a position of the tuner electrode 122 relative to the tuner 120 and in view of the tuner thickness.

The tuner 120 may be fully and actively controllable, based on one or more electrode(s), which may be positioned differently than, and/or in addition to, the tuner electrode 122 that is shown on a top surface of the tuner 120. Placement of the electrodes may be varied (e.g., on a bottom or other surface of the tuner 120) according to specific device design choices/layout.

The tuner 120 may be formed of various materials, whose choice may be used to affect the waveguide 110. For example, if an index of refraction of the tuner 120 is less than diamond (e.g., formed of silicon nitride), the waveguide 110 may still contain a bound mode of light even when the tuner 120 approaches (or even makes contact with) the waveguide 110. In contrast, if the tuner 120 has an index of refraction greater than diamond (e.g., formed of silicon), then the waveguide 110 may not retain a bound mode when the tuner 120 approaches near the waveguide 110. Accordingly, there is a benefit to tuner 120 including materials having a refractive index lower than the diamond waveguide 110, to avoid enabling the bound state of the waveguide 110 to be substantially reduced/eliminated. Leakage of the mode into a higher-index substrate 102 may effectively introduce loss. If the waveguide 110 is in the form of a micro-ring or other resonator, this loss will broaden a resonance of the waveguide 110 (i.e., lower its quality factor), which may degrade its performance, whether it is being used as a switch or as a device for collecting spontaneous emission from NV centers, or other usage/type of device.

The tuner electrode 122 of the tuner 120 also may contribute to interactions with the waveguide 110. Tuner electrode 122 may affect an evanescent field of the diamond waveguide 110, and/or may be positioned in view of materials and geometric arrangement to, e.g., minimize affecting the waveguide 110. In an example, the tuner 120 may be made of a conductive material like polysilicon, which also may serve as the tuner electrode 122. For example, the tuner 120 itself may be doped in at least a portion for increased conductivity, such that a separate material would not be needed to form the tuner electrode 122, nor would the separate tuner electrode 122 need to be located facing toward or away from the waveguide 110. A mode of the waveguide 110 may be affected by the electrode 122. In contrast, if the tuner 120 were formed of a polymer like silicon nitride that does not affect the waveguide 110 in the same way, a separate tuner electrode 122 may be used (e.g., arranged on a lower surface of the tuner 120 to directly face a top of the waveguide 110). A nitride material may be used to form the tuner 120, which may be brought very close to the waveguide 110 without causing issues with characteristics of the waveguide 110.

The tuner electrode 122 may be a transparent material such as indium tin oxide (ITO), and may be a lossy material such as a metal. ITO may provide good contact characteristics as a tuner electrode 122, but does not provide as much loss as most metals or heavily doped polysilicon. Accordingly, example devices 100 may use transparent ITO tuner electrode 122 to enable tuning of a phase of the waveguide 110, which tunes the effective refractive index according to the variable distance of the tuner 120. In contrast, a metal tuner electrode 122 may be used to tune both the index and the metal/obstruction loss of the diamond waveguide 110. Multiple different kinds of materials may be used, e.g., for one or more tuner electrodes 122 and/or the tuner 120, which may include a combination of multiple different types of materials. Use of transparent ITO as the tuner electrode 122 also enables light to pass through and illuminate the waveguide 110, which may be used to optically energize the waveguide 110 directly (e.g., without use of a separate waveguide to couple energy into the waveguide 110).

The effective refractive index of the diamond waveguide 110 thus may be tuned based on the variable distance of the tuner 120 from the waveguide 110. The amount of effect based on distance may also be affected by the materials and/or index of one or more materials used to form the tuner 120 and/or its tuner electrode(s) 122. For example, materials such as polysilicon may have a greater effect on the mode of the waveguide 110, resulting in a first effect caused by the distances of that tuner 120, in contrast to a tuner 120 made of materials having a second different/weaker effect on waveguide modes, for example. Polysilicon and metal electrode(s) also may affect an imaginary component (e.g., loss) of the refractive index, in contrast to affecting a real component (e.g., the phase). Depending on a type of the device 100, the distinction may be useful for providing varied modulation effects between phase and loss. An example switch device may take an input and selectively direct it to two (or more) different outputs. Accordingly, it may be desirable to avoid loss, because efficiency of the 'through' port of the switch may depend directly on a ratio of losses to coupling strengths. In contrast, an example modulator device may have a single output that is based on an on/off power ratio. Accordingly, modulating the device's loss (in contrast to phase) may be acceptable.

In operation, the variable distance between the tuner 120 and the diamond waveguide 110 may be adjusted to change the effective refractive index of the waveguide 110, thereby realizing a refractive index tuning function. The use of a movable component (MEMS) for index tuning enables example devices 100 to undergo efficient and quick refractive index changes, to realize a switching function according to changing distances between the tuner 120 and the waveguide 110. This approach is relatively efficient and fast (on the order of MHz), and only a few volts may be needed, e.g., to shift the tuning wavelength by a linewidth.

The range of variable distance between tuner 120 and waveguide 110 may be chosen such that the tuner 120 is close enough such that its movement, according to the MEMS structure parameters, brings it into or out of the evanescent field of the waveguide 110. In an example, the movement range may be on the order of 300 nanometers or other distance to enable a tuner 120 to move into and out of an evanescent field associated with the waveguide 100. The movement range also may vary based on material properties (e.g., a type of tuner 120 and tuner electrode 122, their thickness(es), number of layers, geometric dimensions, and so on).

Device 100 may operate according to the behavior of waveguides such as the waveguide 110, and may include resonators. In an example, the diamond waveguide 110 may be a diamond microring resonator coupled to two linear waveguides, wherein the microring resonator is tuned to actively control its effective refractive index for optical switching. In an alternate example, device 100 may be a diamond Mach-Zehnder optical switch photonic device. Other devices are possible, such as a Fabry-Perot switch, photonic crystal switch, and other switches using a change in the refractive index of the material to provide a switching function, based on the principles described in the examples herein.

Figure 2:
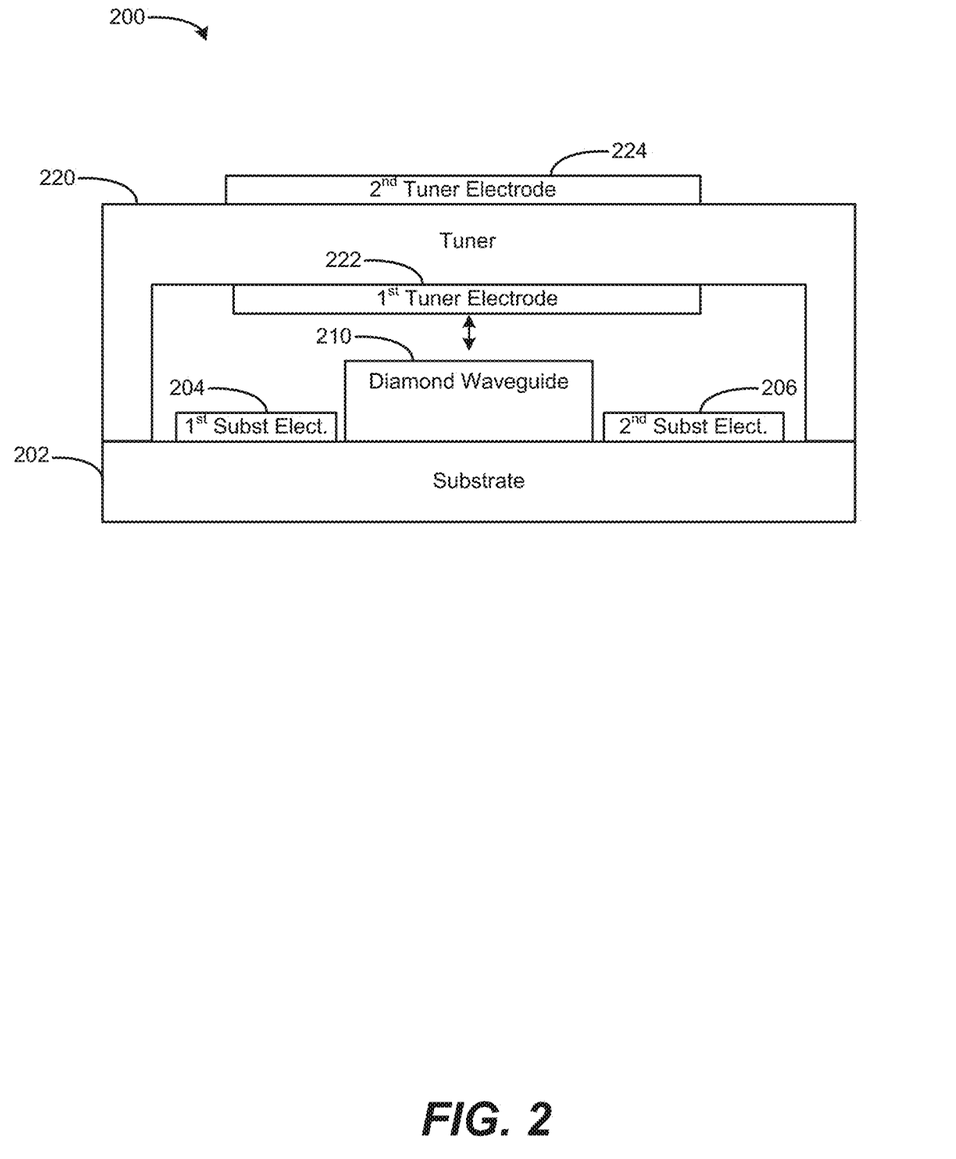
FIG. 2 is a side view block diagram of a device including a tuner and waveguide according to an example.

FIG. 2 is a side view block diagram of a device 200 including a tuner 220 and waveguide 210 according to an example. The waveguide 210 is disposed on a substrate 202. A first substrate electrode 204 and a second substrate electrode 206 also are disposed on the substrate 202. Tuner 220 is disposed on, and extends from, the substrate 202. A first tuner electrode 222 and a second tuner electrode 224 are disposed on the tuner 220.

The example shown in FIG. 2 includes a plurality of electrodes at the substrate 202 and the tuner 220, to provide active control and/or movement of the tuner 220 relative to the waveguide 210. The tuner 220 is shown as a fix-fix MEMS structure, wherein both ends of the tuner membrane extend from the substrate 202. A variable distance between the tuner 220 and the waveguide 210 is enabled based on deformations of the tuner 220. However, the principles described with regard to device 200 also may be used in a fix-free MEMS structure, such as a cantilever arm.

Two sets of electrodes are shown, and examples may use other combinations, positions, and/or arrangements of electrode(s). In an example, the first substrate electrode 204 and the first tuner electrode 222 may work in conjunction to attract (or repel) each other when an electric field is applied, based on opposite charge/voltage polarity for that first electrode set. In contrast, the second substrate electrode 206 and the second tuner electrode 224 may work in conjunction to repel (or attract) each other when an electric field is applied, based on equal charge/voltage polarity for that second electrode set. The second electrode set thus may be used to free a tuner 220 that may be stuck (e.g., stuck to the diamond waveguide 210) by applying an increased voltage level that is sufficiently high to free the tuner 220. The electrodes may be various materials, such as metals, ITO, polysilicon, etc. In an example, the first and second substrate electrodes 204 may be aluminum disposed on a silicon oxide (SiO2) substrate. The various electrodes may be isolated from each other to provide desired effects without interfering with or cancelling out one another. In an alternate example, a single tuner (or substrate) electrode may be used, in conjunction with a pair of opposing electrodes, to provide opposing forces to actively move the tuner 220 in either direction.

Figure 3:
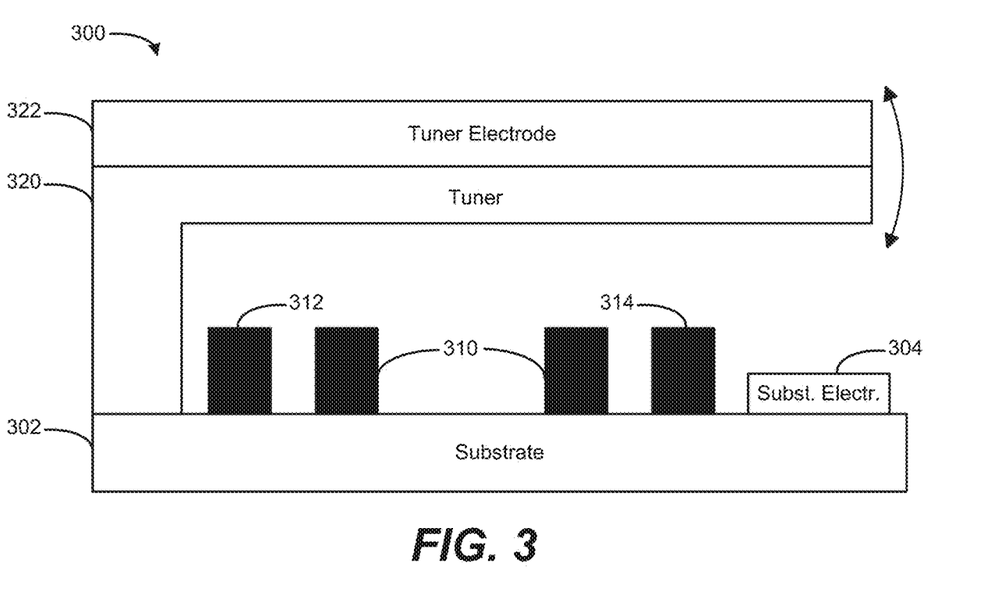
FIG. 3 is a side view block diagram of a device including a tuner and waveguide according to an example.

FIG. 3 is a side view block diagram of a device 300 including a tuner 320 and waveguide 310 according to an example. The tuner 320 is a fix-free cantilever structure extending on one end from the substrate 302 and free on the other end, and includes a tuner electrode 322. In an alternate example, the device 300 may be provided as a fix-fix or other MEMS (including other types of cantilever) structure. The substrate 302 includes a substrate electrode 304, as well as a second waveguide 312 and third waveguide 314 that may be coupled to the first waveguide 310 to form a resonant optical switch.

The device 300 demonstrates a default-position switch example, wherein the tuner 320 is structured to be away from the waveguide 310 by default, such that the cantilever tuner 320 is initially out of the evanescent field of the waveguide 310. A distance between the underside of the tuner 320 and an upper surface of the waveguide 310 may be on the order of 300 nanometers in the illustrated default position, but may vary on device characteristics (e.g., using a thinner gap corresponding to the use of a diamond waveguides and/or properties of the tuner, such as thickness, flexibility, structure, number/type of tuner layers, etc.) to move into and out of a waveguide evanescent field. Under the application of a voltage difference between the tuner electrode 322 and the substrate electrode 304, the tuner 320 may be deflected toward the waveguide 310 to detune the waveguide 310 and turn off the optical switching, e.g., no longer provide output at a drop portion of the first waveguide 312 coupled to the resonant first waveguide 310, and instead provide output at a through portion of the third waveguide 314 also coupled to the resonant first waveguide 310. In the absence of the selective attractive forces provided by the substrate and tuner electrodes 304, 322, the rigid MEMS structure of tuner 320 enables the tuner 320 to spring-back to its default illustrated position. The device 300 also may rely on active positioning to repel the tuner 320 away from the waveguide 310.

The tuner electrode 322 may be various materials, such as a metal, ITO, polysilicon, etc. In an example, the tuner 320 and/or the tuner electrode 322 may be formed of polysilicon, which may be doped to provide electrical characteristics suitable for interaction with the substrate electrode 304. Accordingly, a separate/dedicated tuner electrode 322 may be omitted. The polysilicon has much higher refractive index than the diamond of the waveguides 310, 312, 314, and will greatly affect the effective refractive index of the waveguides 310, 312, 314. Accordingly, polysilicon can serve not only as a contact/electrode, but also as a material that affects the waveguide optical mode(s). The same principles also apply to ITO, which can serve as an electrode and/or a tuner. A refractive index of the tuner 320 may be chosen to be higher or lower than the diamond of the waveguides 310, 312, 314. A material(s) of the tuner 320 may be chosen to have a different refractive index as the waveguide, to affect an effective refractive index of the diamond waveguides 310, 312, 314. Thus, the tuner electrode 322 also may use its refractive index to affect the tuning of the waveguides 310, 312, 314.

A controller (not shown) may be used to apply voltage to the electrodes 322, 304 to achieve a desired movement of the tuner 320. The type of cantilever/membrane tuner movement may depend on how much force is applied to which region of the tuner, which may introduce some deformation. However, the tuner 320 may be formed of a rigid material, such that a force applied by the electrode to one portion may affect at least other portions (e.g., a majority) of the tuner 320. Such characteristics may depend on particular design choices, material properties/thickness, and layout of the tuner 320 and its materials, as well as positions of the electrodes 322, 304. Electrodes may be provided with varying voltages and/or charge polarities as appropriate for actively/passively controlling the tuner 320.

In an example, the device 300 may be fabricated using amorphous silicon (Si) or other polymers/materials (e.g., that are removable by chemicals) as a sacrificial layer beneath the tuner 320, which may be formed from silicon nitride (SiN) for providing rigid support for the tuner 320 for etching/removing the sacrificial layer. One or more electrodes, including tuner electrode 322, may be disposed on the tuner 320, and a metal substrate electrode 304 (e.g., aluminum) may be disposed next to the waveguides 310, 312, 314.

Figure 4:
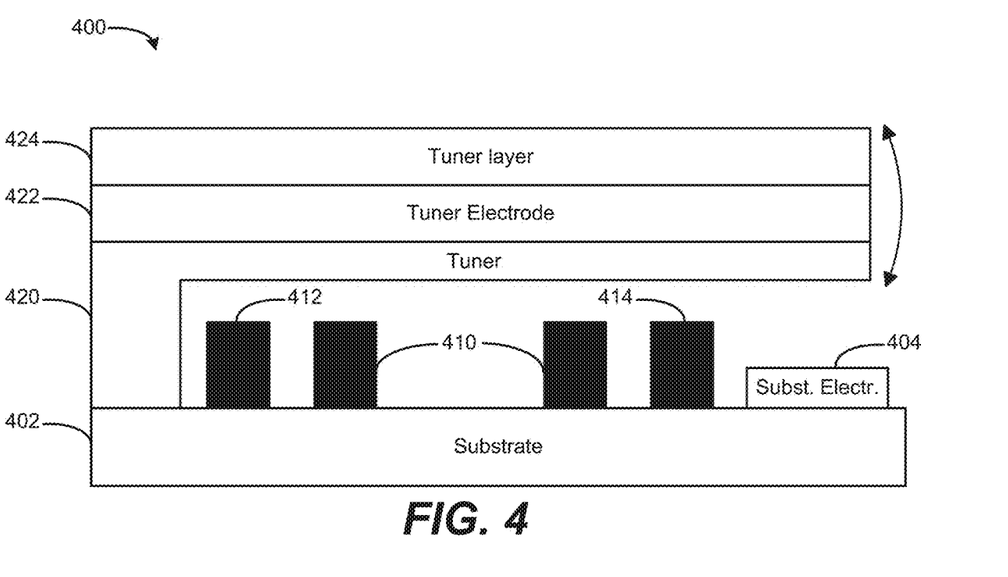
FIG. 4 is a side view block diagram of a device including a tuner and waveguide according to an example.

FIG. 4 is a side view block diagram of a device 400 including a tuner 420 and waveguide 410 according to an example. The tuner 420 is a fix-free cantilever structure including a tuner electrode 422 and a tuner layer 424. The substrate 402 includes a substrate electrode 404, second waveguide 412, and third waveguide 414. In an alternate example, the device 400 may be provided as a fix-fix or other MEMS (including other types of cantilever) structure.

The device 400 illustrates a default arrangement wherein the tuner 420 is biased toward the waveguide 410 by default, such that the tuner is initially by default within range of the evanescent field(s) of the waveguides 410, 412, 414. An on or off state of the device 400 (e.g., any example device, such as a switch) may depend on a resonant frequency to couple to the add/drop switch ports, and may depend on other parameters such as the gap between the waveguide(s) 412, 414 and the ring waveguide 410, a ring waveguide radius, and so on. Index tuning is one aspect of the on/off states of the device 400, based on moving the tuner 420. A distance between underside of tuner 420 and upper surface of the waveguide 410 may be on the order of 100 nanometers or less, depending on coupling effects between the tuner 420 and the waveguides 410, 412, 414. Under the application of a voltage difference between tuner electrode 422 and substrate electrode 404, the tuner 420 may be biased away from the waveguide 410 to tune the waveguide 410 to turn on the optical switching (e.g., switch from providing output at a through portion of the third waveguide 414, to instead providing output at the drop portion of the second waveguide 412). Removal of applied voltage at the electrode(s) enables the tuner 420 to return to the default state. In an alternate example, an electrode(s) may be used to actively return the tuner 420 to the default state. Thus, electrode polarity may be changed as desired, to attract or repel the tuner 420 to or from the diamond waveguides 410, 412, 414.

Tuner 420 includes a tuner electrode layer 422 within the tuner 420, i.e., not on an external surface of the tuner 420. In alternate examples, the tuner 420 may use fewer or greater number of layers, and may include an electrode on a surface of the tuner 420. Tuner layer 424 may be disposed on the tuner electrode 422. The tuner layer 424 may be provided as a layer of polysilicon disposed on top of an ITO tuner electrode 422. Accordingly, the tuner layer 424 may enable the tuner, when at a close proximity to the waveguide 410, to have a larger impact on affecting the effective refractive index/phase of the waveguide 410. The illustrated three layers of the tuner 420 may vary in type of materials. In an example, the tuner 420 may be SiN, the tuner electrode 422 may be ITO, and the tuner layer 424 may be polysilicon.

The tuner 420 may have multiple different layers as a compound tuner 420, may be formed as a single layer of single material, may include a transparent contact 422 or a lossy contact 422, and the contact may be disposed inside the tuner 420, sandwiched by different material, or outside on a surface of the tuner 420. Although the tuner layer 424 is shown in FIG. 4, the tuner layer 424 also may be included in FIG. 3 (and may be omitted from FIG. 4). Generally, the illustrated layers may be included or omitted in various combinations as described throughout, and an illustrated layer may be formed by multiple sub-layers, including sub-layers of different materials.

Figure 5:
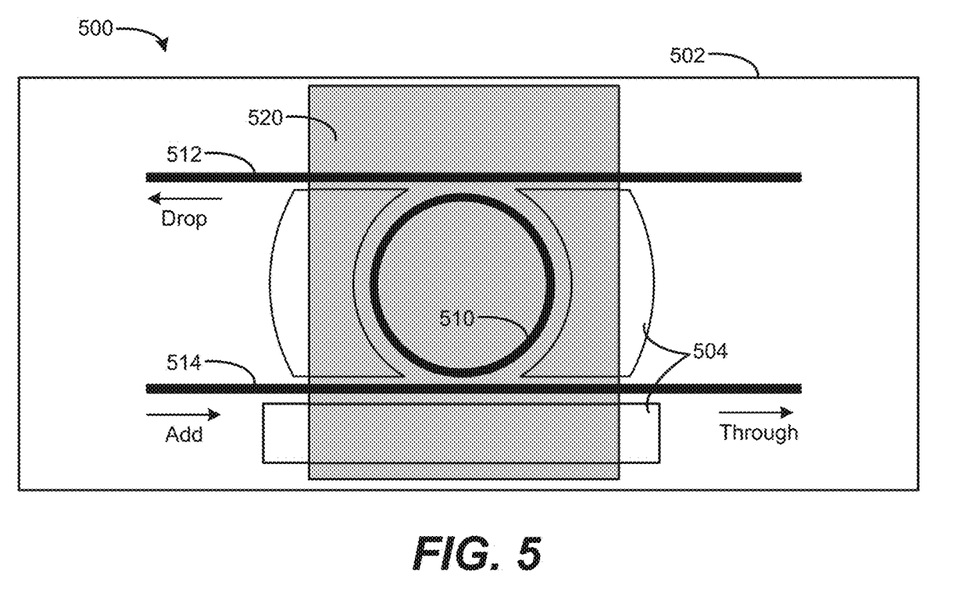
FIG. 5 is a top view block diagram of a device including a tuner and waveguide according to an example.

FIG. 5 is a top view block diagram of a device 500 including a tuner 520 and waveguide 510 according to an example. The waveguide 510 is disposed on substrate 502, along with the second waveguide 512, third waveguide 514, and substrate electrodes 504. The tuner 520 is a fix-free cantilever that extends from the substrate 502 on one end.

Device 500 illustrates an example of a diamond microring resonator waveguide 510 optically coupled to two linear waveguides 512, 514 to form an add/drop filter. The tuner 520 includes a transparent electrode such that the waveguides 510, 512, 514 are visible through the transparent electrode (e.g., ITO, a very thin metal, etc.) and tuner 520. Accordingly, light may be used to directly illuminate and/or affect the underlying waveguides 510, 512, 514 (or other structures beneath the tuner 520).

The tuner 520 is shown as a cantilever having a generally rectangular shape, on the order of 20 micrometers wide. The tuner is formed as a membrane of SiN, and includes an ITO electrode on top. The waveguide 510 is shown as a diamond microring having a diameter on the order of 10 micrometers. Waveguides 512, 514 also are formed of diamond. The substrate electrodes 504 are metal contacts (e.g., aluminum, copper, and so on) disposed on the substrate 502. The substrate electrodes 504 may be laterally spaced from the waveguides, e.g., having a separation distance on the order of a few hundred nanometers.

In an example, the diamond microring may have a diameter of approximately 2-10 microns. The cantilever tuner 520 may have a width that is to cover at least the region described by the microring waveguide 510. In an alternate example, the tuner 520 may be narrower than a diameter of the microring waveguide 510. If the tuner 520 is narrower than the microring waveguide 510, it may introduce scattering loss at the tuner edges. The electrode 504 may surround at least a portion of the microring waveguide 510, to provide enough force to electrically move the cantilever tuner 520 based on desired voltage levels in view of the facing surface area between electrodes. Accordingly, the tuner 520 may be wide enough and/or long enough to overlap at least a portion of the electrodes 504, which similarly may be shaped as needed. As shown, the tuner 520 overlaps at least a portion of all three subsections of the substrate electrode 504. Different sections may be used to provide different polarities/voltage levels to attract, repel, or otherwise actively control the tuner 520.

In operation, a tuning voltage may be applied between the electrode of the tuner 520 and substrate electrodes 504 by a controller (not shown) to apply a moving force to the tuner 520. The electrodes 504 may include first and second electrodes to apply attracting and/or repelling forces. The tuner 520 moves accordingly, thereby interacting with an evanescent field of the waveguide(s) 510, 512, and/or 514, to change corresponding refractive index/indeces and operate as a switch between the add and drop ports of the device 500. If the resonator waveguide 510 is in tune with the input optical frequency, light in the linear waveguide 514 couples to the resonator waveguide 510 and travels to the drop port. Thus, at resonant wavelengths an optical signal may pass to the drop filter. At detuning, light transmits to the through port without coupling to the microring waveguide 510. The switching function is thus realized by tuning the refractive index of the diamond waveguide 510 and corresponding resonant frequencies according to the variable distance between the tuner 520 and the waveguide 510.

Figure 6:
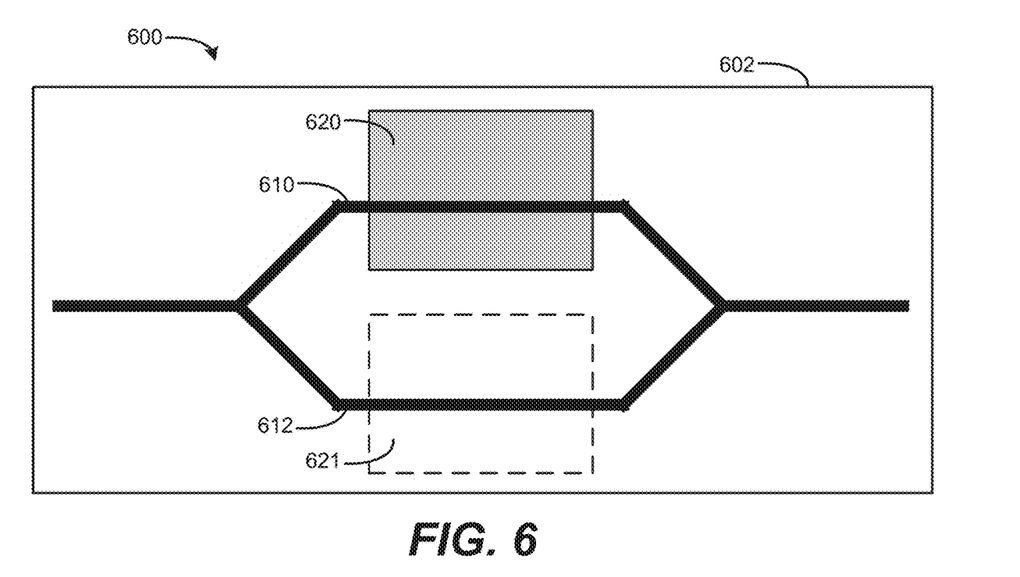
FIG. 6 is a top view block diagram of a device including a tuner and waveguide according to an example.

FIG. 6 is a top view block diagram of a device 600 including a tuner 620 and waveguide 610 according to an example. The tuner 620 extends from the substrate 602. A second tuner 621 may be used, A first arm 610 and a second arm 612 are disposed on the substrate 602, to form a diamond Mach-Zehnder optical switch/modulator photonic device 600.

A switching/modulating/filtering function can be realized by tuning the refractive index of at least one branch of the Mach-Zehnder switch, e.g., first arm 610 and/or second arm 612. The MEMS-based movable tuner 620 (and associated tuner/substrate electrodes) are shown disposed at first arm 610 of device 600. In an alternate example, a second tuner 621 may be disposed on second arm 612, instead of or in addition to the first tuner 620 on the first arm 612. A tuner may be default-on or default-off, and may be controllable in one or both directions according to attracting and/or repelling electrode action. Accordingly, the effective index of one or more arms of device 600 may be controlled, based on the principles and examples described above regarding movable tuners. Relatively large changes in effective index are enabled by these techniques (e.g., up to ~0.1, although there may be some losses due to edge scattering, if applicable). Such index changes are much larger compared with what can be achieved by other techniques such as thermal tuning or carrier injection. Accordingly, the example techniques described herein enable construction of a Mach-Zehnder interferometer that is very compact (e.g., on the order of tens of microns or less).

Figure 7:
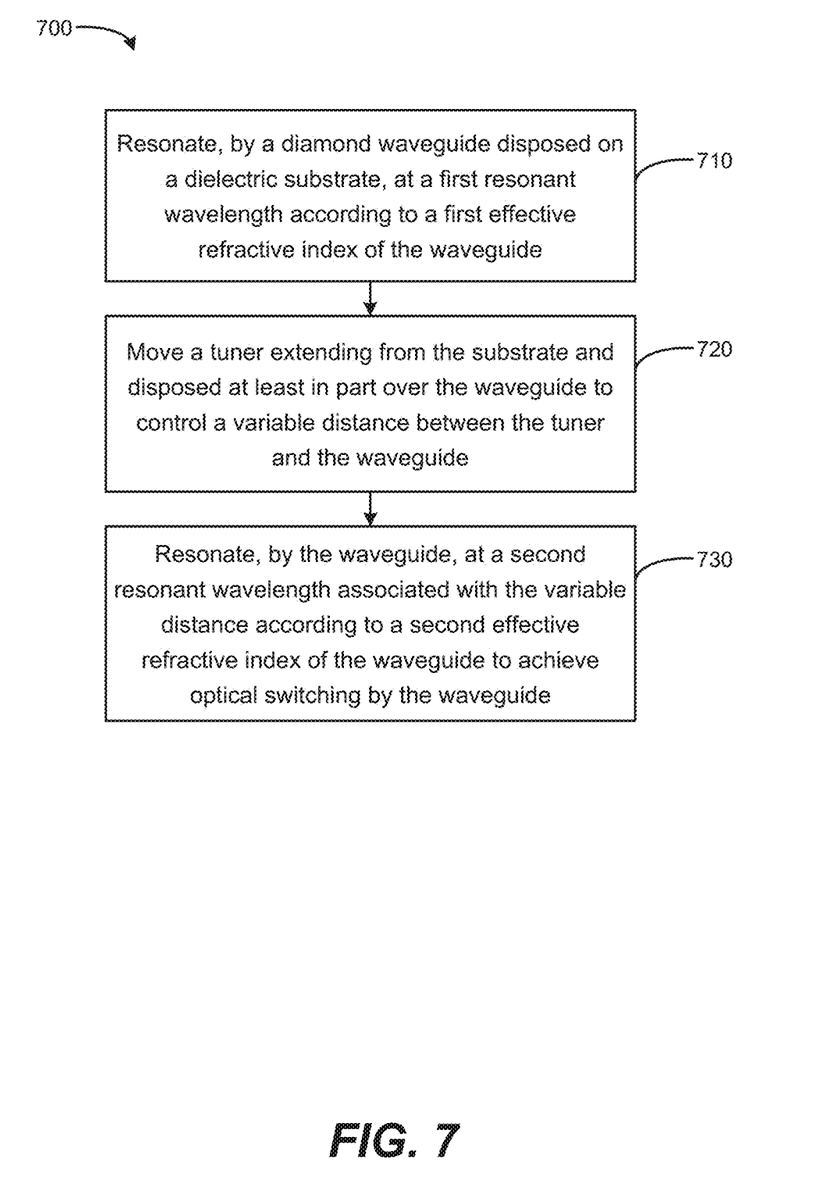
FIG. 7 is a flow chart based on optical switching by a waveguide according to an example.

Referring to FIG. 7, a flow diagram is illustrated in accordance with various examples of the present disclosure. The flow diagram represents processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

FIG. 7 is a flow chart based on optical switching by a waveguide according to an example. In block 710, a diamond waveguide disposed on a dielectric substrate is to resonate at a first resonant wavelength according to a first effective refractive index of the waveguide. For example, the diamond waveguide may be a microring resonator associated with an evanescent field. In block 720, a tuner extending from the substrate and disposed at least in part over the waveguide is moved to control a variable distance between the tuner and the waveguide. For example, at least one tuner electrode may interact with a substrate electrode(s) to actively pull/push the tuner into/out of an evanescent field of the resonator according to a variable distance. In block 730, the waveguide is to resonate at a second resonant wavelength associated with the variable distance according to a second effective refractive index of the waveguide to achieve optical switching by the waveguide. For example, the tuner may partially couple with the evanescent field of the resonator, due to an electrode and tuner layer disposed on a multi-layer tuner.

What is claimed is:

1. A device comprising:
    a diamond waveguide disposed on a substrate comprised of a dielectric material;
    a tuner extending from the substrate such that a portion of the tuner is attached to the substrate, the tuner being disposed at least in part over the waveguide; and
    a first tuner electrode and a second tuner electrode disposed on the tuner such that at least a portion of the tuner is sandwiched between the first and second tuner electrodes and configured to control a variable distance between the tuner and the waveguide to vary an effective refractive index of the waveguide based on a first voltage/charge polarity applied to the first tuner electrode and a second voltage/charge polarity applied to the second tuner electrode, wherein both the first tuner electrode and second turner electrode are spaced from the substrate.

2. The device of claim 1, wherein the tuner is a cantilever arm that includes a non-biased position toward the waveguide, and the tuner is movable away from the waveguide based on the second tuner electrode.

3. The device of claim 1, wherein the tuner is a cantilever arm that includes a non-biased position away from the waveguide, and the tuner is movable toward the waveguide based on the first tuner electrode.

4. The device of claim 1, wherein the tuner is movable based on the second tuner electrode in a direction opposing movement caused by the first tuner electrode.

5. The device of claim 4, further comprising a substrate electrode disposed on the substrate corresponding to the first tuner electrode, and a second substrate electrode disposed on the substrate corresponding to the second tuner electrode.

6. The device of claim 1, wherein the first tuner electrode is disposed on a surface of the tuner facing toward the waveguide.

7. The device of claim 1, wherein the second tuner electrode is disposed on a surface of the tuner facing away from the waveguide.

8. The device of claim 1, wherein the first or second tuner electrodes are disposed at a tuner electrode layer within the tuner.

9. The device of claim 8, wherein the tuner includes another material having a substantially higher refractive index than the diamond waveguide, to provide a wide range of tuning for the effective refractive index of the waveguide.

10. The device of claim 1, wherein the waveguide comprises a microring disposed between two waveguides to form an add/drop filter.

11. The device of claim 1, wherein the waveguide comprises at least one of a first arm and a second arm of a Mach-Zehnder modulator.

* * * * *